Patented Oct. 31, 1933

1,932,595

UNITED STATES PATENT OFFICE 1,932,595

HALOGENATED BIS-(HYDROXY-ARYL)-OXIDES

Friedrich Muth, Leverkusen-on-the-Rhine, and Georg Wesenberg, Wuppertal-Sonnborn, Germany, assignors to Winthrop Chemical Company, Inc., New York, N. Y., a corporation of New York No Drawing. Application December 19, 1931, Serial No. 582,170, and in Germany May 9, 1930

21 Claims. (Cl. 260—150)

This invention relates to bis-(hydroxy-aryl)-oxides being substituted in the aryl radical by at least one halogen atom and displaying disinfecting, preserving and insecticidal properties; it further relates to a process of preparing the new halogenated bis-(hydroxy-aryl)-oxides.

In accordance with our present invention bis-(hydroxy-aryl)-oxides being substituted in the aryl radical by at least one halogen atom are obtainable by reacting upon the bis-(hydroxyaryl)-oxides with a halogenating agent. Depending on the quantity of the halogenating agent used one or more halogen atoms can be introduced into the aryl radical. As halogenating agent we use preferably halogen in the molecular state, but also other halogenating agents have proved operable, for instance, sulfurylchloride and alkali hypochlorite for the chlorination process. The reaction caused in our new process proceeds when starting, for example, with a bis-(hydroxy-phenyl)-oxide and bromine according to the following equation

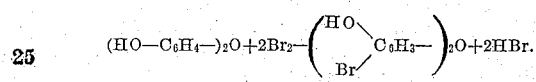

By this equation it becomes obvious that for the introduction of one halogen atom one mol of the halogen is required. The reaction is performed in the presence of a solvent which is inert to the starting components. We prefer to use glacial acetic acid as solvent, but also other solvents which are inert to the reacting components; for example, ether, halogenated hydrocarbons, such as carbon tetrachloride and tetrachloroethane, further halogenated benzenes, may be employed. The reaction proceeds advantageously when gradually adding the halogenating agent at room temperature; however, heating up to the boiling point of the solvent used is in general advisable for accelerating the halogenating process. The halogenation may be further favored by working in bright light, say in the light of an ultroviolet lamp. Sometimes the addition of a small quantity of a catalyst, for example, of iron or iron iodide is of advantage. The reaction is complete when, after the addition of the whole quantity of the halogenating agent to be employed in order to introduce the desired number of halogen atoms, the development of hydrogen halide has ceased. From the reaction mixture the halogenated bis-(hydroxy-aryl)-oxides are separated depending on the kind of solvent used. Sometimes it is advisable to evaporate the solvent, in other cases the reaction product may be obtained by extracting the reaction solution by means of an aqueous caustic alkali solution and acidifying the alkaline solution obtained. When using glacial acetic acid as solvent the reaction product may be precipitated from the solution by the addition of water.

It may be mentioned that our new compounds are likewise obtainable from amino-substituted bis-(hydroxyaryl)-oxides by Sandmeyer's reaction. If it is desired to introduce the halogen atom into a definite position, it may be of advantage to act upon the bis-(hydroxyaryl)-oxide in form of its O-acyl or O-alkyl derivatives and subsequently split off the acyl- or alkyl group to form the free hydroxy group.

As aryl radicals there can be present in our new compounds isocyclic aromatic ring systems, for example, phenyl-, naphthyl-, tetrahydronaphthyl- and similar radicals. According to the starting materials selected symmetrically or unsymmetrically substituted bis-(halogen-hydroxy-aryl)-oxides are produced.

We prefer to prepare the symmetrical chloro- and-bromo-substitution products of the bis-hydroxy-phenyl-oxides.

Our new compounds are in general white crystalline powders, which are insoluble or sparingly soluble in water, but dissolve in form of their alkali metal salts in aqueous caustic alkali solutions and are fairly soluble in acohol, acetone and acetic acid.

The new compounds as such or in form of their preferably water-soluble salts which are to be considered equivalent to the compounds with the free hydroxy groups, possess bactericidal, fungicidal and insecticidal properties and may be used for combating pathogenic plant micro organisms, for example, mildew, bacteria and animal pests, for treating seed grain, for disinfecting and preserving the most different materials susceptible to infection or capable of carrying infection, for example, dead wood, foods, latex fabrics which are rendered moth-proof, skins and the like, for cosmetic purposes, for example, for face powders or media for hyperidrosis, or for disinfection in the medicinal practice. Therefore according to the present invention preserving, disinfecting and insecticidal preparations can be obtained for the most different purposes of application.

For disinfecting or preserving purposes and for combating insects the above mentioned compounds may be used alone or in admixture with each other or with other appropriate preserving, disinfecting or insecticidal media. They may be dissolved in a suitable solvent preferably in the form of the alkali metal salts in water, or may be diluted with an inert filler or diluent the nature of which and the amount of dilution therewith depending on the purpose for which the preparation is intended. The active agent may, for example, be ground with an inert powder, such as talcum, or it may be incorporated with soap or in an ointment. Furthermore, as solvents may be used aqueous solutions of alkali-or alkaline earth metal hydroxides, of ammonia and organic bases containing nitrogen and organic solvents, such as alcohol, benzene, ligroin, or the like. In general, the active agent will be present in a very small proportion in the preparation to be used depending on the kind of application as well as on the manner of the active agent used. Very satisfactory results have been obtained, for example, by the use of bis-(4-hydroxy-3-chloro-phenyl)-, bis-(3-hydroxy-4-bromophenyl)- or bis-(2-hydroxy-3-chloro-phenyl)-oxide, bis-(2-hydroxy-5-chloro- or 5-bromo- or 5-iodo- or 5-fluoro-phenyl)-oxide, bis-(2-hydroxy-3-nitro-5-chlorophenyl)-oxide, bis-(2-hydroxy- or 4-hydroxy-3.5-dichloro- or 3.5-dibromo-phenyl)-oxide, 2.3-dihydroxy-3'-hydroxy-4'-bromo-diphenyl)-oxide, 2.2'-dihydroxy-5-chloro-4'-methyl-diphenyl-oxide, bis-(2'-hydroxy-5'-bromo-4-phenoxyphenyl)-oxide, 2-hydroxy-5-bromo-naphthyl-2'-hydroxy-6'-bromo-phenyl-oxide, bis-(1-hydroxy-4-chloro-naphthyl-2-)-oxide and the like.

The invention is further illustrated by the following examples without being restricted thereto:

*Example 1*

10 parts by weight of bis-(2-hydroxyphenyl)-oxide (obtainable in accordance with Berichte 39 (1906), page 624) are dissolved with heating in 50 parts by weight of glacial acetic acid. A solution of 16 parts by weight of bromine in 20 parts by weight of glacial acetic acid is dropped in at water-bath temperature and heating is continued until the evolution of hydrogen bromide ceases. The resulting solution is filtered and concentrated in vacuo until crystallization begins. The bis-(2-hydroxy-5-bromophenyl)-oxide then crystallizes in small white needles arranged in rosettes. It crystallizes from much water in white needles melting at 126° C. and has the probable fromula:

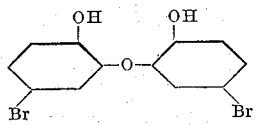

A mixture of one part by weight of bis-(2-hydroxy-5-bromophenyl)-oxide with 10 parts by weight of talcum operates to combat pathogenic plant micro-organisms, for example, stone blight of wheat.

10 parts by weight of bis-(2-hydroxy-5-bromophenyl)-oxide and 10 parts by weight of soft or potash soap are made up with water after the addition of the requisite amount of alkali to 100 parts. A 2% solution of this mixture is employed for combating various animal pests.

5 parts by weight of bis-(2-hydroxy-5-bromophenyl)-oxide and 10 parts by weight of glycerol are finely ground together and then 40 parts by weight of lanoline and 45 parts by weight of petroleum jelly are added. This ointment may be used directly for cosmetic purposes, for example, for hyperidrosis.

The aqueous solution of the sodium salt of bis-(2-hydroxy-5-bromophenyl)-oxide even in concentrations as low as 1:100000 arrests the growth of staphylococci and kills them in a concentration as low as 1:10000 in less than one hour.

One part by weight of bis-(2-hydroxy-5-bromophenyl)-oxide is dissolved in 40 parts by weight of water with the addition of about 10 parts by weight of normal ammonia solution. This solution protects albumen solutions from decay.

10 parts by weight of bis-(2-hydroxy-5-bromophenyl)-oxide, in the form of the sodium salt, are mixed with 10000 parts by weight of a dry paste. This mixture is protected from attack by mould even when kept in a moist state. The paste obtained therefrom by mixing with water will keep for a prolonged period.

The skin of an animal which has died of anthrax is treated with 10 times the quantity of an aqueous caustic alkaline solution of bis-(2-hydroxy-5-bromophenyl)-oxide of a concentration of 1:1000 during 48 hours. After this time the anthrax bacteria have been killed without injuring the skin.

The said solution can likewise be used for sterilizing catgut.

In an analogous manner as above described the bis-(3-bromo-4-hydroxyphenyl)-oxide is obtainable when starting with bis-(4-hydroxy-phenyl)-oxide. The bis-(3-bromo-4-hydroxyphenyl)-hydroxide may be used as preserving, disinfecting and insecticidal medium in a similar manner as above indicated.

*Example 2*

10 grams of bis-(2-hydroxyphenyl)-oxide are dissolved in 50 ccs. of glacial acetic acid. A moderate current of chlorine (about two mols) is passed in at 60–70° C. in the light of an ultra violet lamp. Finally heating is resorted to about 110° C. The whole process lasts some two hours. After cooling, the reaction mass is poured into water, the resulting resinous cake is separated from the liquid and dissolved in dilute caustic alkali. On acidification the new chlorine derivative is obtained as a whitish powder. It melts at about 50–60° C. and contains about 47% of chlorine and is presumably substantially the bis-(2-hydroxy-5-chlorophenyl)-oxide.

10 parts by weight of bis-(2-hydroxy-5-chlorophenyl)-oxide, 80 parts by weight of talcum and 10 parts by weight of the sodium salt of isobutyl-naphthalene-sulfonic acid are intimately mixed. This composition is suitable for treating seed grain.

20 parts by weight of bis-(2-hydroxy-5-chlorophenyl)-oxide are dissolved in 100 parts by weight of normal caustic soda lye. This solution is then diluted to 5% and dead wood is treated in the usual manner.

5 parts by weight of bis-(2-hydroxy-5-chlorophenyl)-oxide and 10 parts by weight of glycerol are finely ground together and then 40 parts by weight of lanoline and 45 parts by weight of petroleum jelly are added. This ointment may be used directly for cosmetic purposes, for example, for hyperidrosis.

When chlorinating bis-(3-hydroxy-phenyl)-oxide, the bis-(3-hydroxy-chlorophenyl)-oxide containing the chlorine atoms presumably in the 6 positions and displaying similar properties as the bis-(2-hydroxy-5-chlorophenyl)-oxide, is obtainable.

*Example 3*

2 grams of bis-(2-hydroxyphenyl)-oxide are dissolved in 25 ccs. of concentrated ammonia and 40 ccs. of normal iodine solution are added drop by drop while stirring. The reaction mass is allowed to stand for several hours and the brown precipitate produced is filtered. The latter is purified by dissolving in hot alcohol with the addition of a little caustic soda, filtering and adding acetic acid while cooling. The reaction product is isolated by filtering with suction and washing with water, to which a little sodium bisulfite has been added. It presumably possesses the constitution of bis-(2-hydroxy-5-iodophenyl)-oxide, and displays similar properties as the products described in Examples 1 and 2.

Example 4

10.1 grams of bis-(2-hydroxyphenyl)-oxide are dissolved in 100 ccs. of glacial acetic acid by heating on the water-bath. To this solution 32 parts by weight of bromine are added drop by drop in the course of about half-an-hour. When the vigorous evolution of hydrogen bromide has subsided, the reaction mass is heated to boiling for a further 1½ hours. After cooling the solution is poured into ice water and the precipitate is filtered with suction. It is purified by dissolving in hot water with the addition of caustic soda, adding a little animal charcoal, filtering and acidifying with acetic acid at about 40° C. The white precipitate is filtered with suction, washed and dried. It crystallizes from much ligroin in white needles melting at 162–163° C. The constitution is presumably that of a bis-(2-hydroxy-3.5-dibromophenyl)-oxide of the formula:

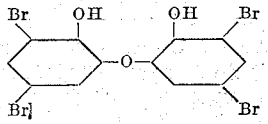

Fabrics impregnated with 3% of bis-(2-hydroxy-3.5-dibromophenyl)-oxide are not attacked by mildew and are rendered moth-proof.

For example, 100 parts by weight of wool, well wetted, are impregnated in a cold or heated bath of about 1:20 of the sodium salt of bis-(2-hydroxy-3.5-dibromophenyl)-oxide. The bath is exhausted in a short time and the substance fixed on the fiber. The wool is rinsed or acidified in the customary manner and dried.

10 parts by weight of bis-(2-hydroxy-3.5-dibromophenyl)-oxide and 10 parts by weight of soft or potash soap are made up with water after the addition of the requisite amount of alkali to 100 parts. A 2% solution of this mixture is employed for combating various animal pests.

In a similar manner bis-(4-hydroxyphenyl)-oxide may be brominated to a compound the formula of which presumably is that of the bis-(3.5-dibromo-4-hydroxyphenyl)-oxide. It displays analogous properties to those of the 2-hydroxy compound.

Also the bis-(dichloro-2-hydroxyphenyl)-oxide, obtained when starting with chlorine in an analogous manner, displays disinfectant properties. For example, polishes of disinfectant action are obtainable in the following manner:

5 parts by weight of bis-(dichloro-2-hydroxyphenyl)-oxide are melted with 20 parts by weight of yellow wax. This mixture is added to the known polish bases. A polish containing, for example, 20% of the above mixture kills in a few hours bacteria, such as staphylococcus which are carried on to it.

Instead of the yellow wax, other waxes or solvents, such as liquid paraffin, customarily used for the manufacture of polishes, can be employed.

Example 5

15.1 grams of bis-(6-hydroxynaphthyl-2)-oxide are suspended in 200 ccs. of glacial acetic acid and 16 grams of bromine are dropped in at water-bath temperature while stirring. The reaction mass is then heated to boiling and after the whole of the bromine has been dropped in is kept at the boil for a further hour. After cooling the mass is poured into ice water and the precipitate is filtered with suction, washed and dried. On crystallization from much ligroin crystals are obtained melting at 125° C. The new compound presumably possesses the constitution of bis-(6-hydroxy-5-bromonaphthyl-2)-oxide.

In a corresponding manner bis-(7-hydroxybromonaphthyl-2)-oxide is produced by dropping 8.5 grams of bromine into a solution of 8.5 grams of bis-(7-hydroxynaphthyl-2)-oxide in 500 ccs. of glacial acetic acid.

Bis-(1-hydroxy-4-bromo-tetrahydronaphthyl-2)-oxide is obtained in an analogous manner when starting with bis-(1-hydroxy-naphthyl-2)-oxide.

The above described naphthyl-derivatives may be used in a similar manner as described in the foregoing examples.

Example 6

11.4 grams of bis-(2-methoxyphenyl)-oxide are dissolved in 50 ccs. of glacial acetic acid and 10 grams of nitric acid (density 1.4) are added at 10° C. The temperature rises slowly to 38° C. and then falls again. After standing for 12 hours the solution is evaporated to dryness in vacuo and the reddish-yellow product obtained ground finely and boiled with 60 ccs. of alcohol. The residue then shows the melting point 177° C. On crystallization from much toluene pale yellow crystals of the same melting point are obtained.

14 grams of the bis-(2-methoxy-nitrophenyl)-oxide thus obtainable are dissolved in 100 ccs. of boiling glacial acetic acid and brominated in the known manner by dropping in 14 grams of bromine. 10 grams of the resulting monobromo-bis-(2-methoxy-nitrophenyl)-oxide are heated to 100° C. in a tube for 20 hours with 10 times the quantity of glacial acetic acid saturated with hydrogen bromide. The clear solution is then poured into water, the acid partly neutralized with caustic soda and the pale yellow precipitate of the monobromo-bis-(2-hydroxy-nitrophenyl)-oxide is filtered with suction and washed. It dissolves readily in aqueous caustic soda and is reprecipitated by hydrochloric acid. Melting point 195° C. It displays likewise preserving, disinfectant and insecticidal properties.

Example 7

25.3 grams of bis-(2-methoxy-5-aminophenyl)-oxide are converted into the diazonium sulfate in the known manner. 70 grams of potassium bromide are introduced into the diazo solution and 30 grams of copper powder are added all at once at about 40° C. The temperature is raised to about 60° C. until the presence of diazo compound can no longer be detected. The reaction product obtained is dissolved in glacial acetic acid, hydrogen bromide is passed in and the whole is heated to water-bath temperature in a pressure vessel for about 12 hours. After cooling the solution is filtered, concentrated in vacuo and water is added. The precipitate is dissolved in dilute caustic soda and the bis-(2-hydroxy-5-bromophenyl)-oxide is precipitated by means of acetic acid or dilute hydrochloric acid in the form of a white precipitate.

This is a continuation in part of our copending application Serial No. 535,572, filed May 6, 1931.

We claim:—

1. Bis-(hydroxy-aryl)-oxides of the general formula (HO—R—)₂O, in which R stands for an aryl radical selected from the benzene, naphthalene and tetrahydronaphthalene series, which bis-(hydroxy-aryl)-oxides are substituted in the aryl radical by at least one halogen atom, said products being in general white crystalline powders, insoluble in water, fairly soluble in alcohol, acetone and glacial acetic acid, being soluble in water in form of their alkali metal salts, displaying disinfecting, preserving and insecticidal properties.

2. Bis-(hydroxy-phenyl)-oxides, being substituted in the phenyl radical by at least one halogen atom, said products being in general white crystalline powders, insoluble in water, fairly soluble in alcohol, acetone and glacial acetic acid, being soluble in water in form of their alkali metal salts, displaying disinfecting, preserving and insecticidal properties.

3. Bis-(halogen-hydroxy-aryl)-oxides the aryl radicals of which are selected from the benzene, naphthalene and tetrahydronaphthalene series, said products being in general white crystalline powders, insoluble in water, fairly soluble in alcohol, acetone and glacial acetic acid, being soluble in water in form of their alkali metal salts, displaying disinfecting, preserving and insecticidal properties.

4. (Bis-(halogen-hydroxy-phenyl)-oxides, said products being in general white crystalline powders, insoluble in water, fairly soluble in alcohol, acetone and glacial acetic acid, being soluble in water in form of their alkali metal salts, displaying disinfecting, preserving and insecticidal properties.

5. Bis-(monohalogen-hydroxy-phenyl)-oxides, said products being in general white crystalline powders, insoluble in water, fairly soluble in alcohol, acetone and glacial acetic acid, being soluble in water in form of their alkali metal salts, displaying disinfecting, preserving and insecticidal properties.

6. Bis-(monohalogen-2-hydroxy-phenyl)-oxides, said products being in general white crystalline powders, insoluble in water, fairly soluble in alcohol, acetone and glacial acetic acid, being soluble in water in form of their alkali metal salts, displaying disinfecting, preserving and insecticidal properties.

7. Bis-(2-hydroxy-5-halogen-phenyl)-oxides, said products being in general white crystalline powders, insoluble in water, fairly soluble in alcohol, acetone and glacial acetic acid, being soluble in water in form of their alkali metal salts, displaying disinfecting, preserving and insecticidal properties.

8. Bis-(2-hydroxy-5-chloro-phenyl)-oxide, said product being a whitish powder, melting at about 50–60° C., being insoluble in water, fairly soluble in alcohol, acetone and glacial acetic acid, being soluble in water in form of its alkali metal salts, displaying disinfecting, preserving and insecticidal properties.

9. Bis-(2-hydroxy-5-bromo-phenyl)-oxide, said product crystallizing in white needles melting at 126° C., being sparingly soluble in water, fairly soluble in alcohol, acetone and glacial acetic acid, being soluble in water in form of its alkali metal salts, displaying disinfecting, preserving and insecticidal properties.

10. Bis-(dihalogen-hydroxy-phenyl)-oxides, said products being in general white crystalline powders, insoluble in water, fairly soluble in alcohol, acetone and glacial acetic acid, being soluble in water in form of their alkali metal salts, displaying disinfecting, preserving and insecticidal properties.

11. Bis-(dihalogen-2-hydroxy-phenyl)-oxides, said products being in general white crystalline powders, insoluble in water, fairly soluble in alcohol, acetone and glacial acetic acid, being soluble in water in form of their alkali metal salts, displaying disinfecting, preserving and insecticidal properties.

12. Bis-(2-hydroxy-3.5-dihalogen-phenyl)-oxides, said products being in general white crystalline powders, insoluble in water, fairly soluble in alcohol, acetone and glacial acetic acid, being soluble in water in form of their alkali metal salts, displaying disinfecting, preserving and insecticidal properties.

13. Bis-(2-hydroxy-3.5-dibromo-phenyl)-oxide, said product crystallizing in white needles melting at 162–163° C., being insoluble in water, fairly soluble in alcohol, acetone and glacial acetic acid, being soluble in water in form of its alkali metal salts, displaying disinfecting, preserving and insecticidal properties.

14. The process which comprises reacting upon a bis-(hydroxy-aryl)-oxide, the aryl radicals of which are selected from the benzene, naphthalene and tetrahydronaphthalene series, with a halogenating agent in the presence of a solvent being inert to the reacting components.

15. The process which comprises reacting upon a bis-(hydroxy-phenyl)-oxide with a halogenating agent in the presence of a solvent being inert to the reacting components.

16. The process which comprises reacting upon a bis-(hydroxy-phenyl)-oxide with a halogen in the molecular state in the presence of a solvent being inert to the reacting components.

17. The process which comprises reacting upon a bis-(hydroxy-phenyl)-oxide with chlorine in the presence of a solvent being inert to the reacting components while heating.

18. The process which comprises reacting upon bis-(2-hydroxy-phenyl)-oxide with chlorine in the presence of a solvent being inert to the reacting components while heating.

19. The process which comprises reacting upon bis-(2-hydroxy-phenyl)-oxide in the solution of glacial acetic acid with about two mols of chlorine while heating on the water-bath until no more hydrochloric acid is developed.

20. The process which comprises reacting upon bis-(2-hydroxy-phenyl)-oxide in the solution of glacial acetic acid with bromine in the presence of a solvent being inert to the reacting components while heating.

21. The process which comprises reacting upon bis-(2-hydroxy-phenyl)-oxide in glacial acetic acid solution with about two mols of bromine while heating on the water-bath until no more hydrobromic acid is developed.

FRIEDRICH MUTH.
GEORG WESENBERG.